(12) United States Patent
Wideman et al.

(10) Patent No.: US 8,187,687 B2
(45) Date of Patent: May 29, 2012

(54) REINFORCING MATRIX FOR SPOOLABLE PIPE

(75) Inventors: Thomas W. Wideman, Milton, MA (US); Peter A. Quigley, Duxbury, MA (US)

(73) Assignee: Fiberspar Corporation, New Bedford, MA (US)

( * ) Notice: Subject to any disclaimer, the term of this patent is extended or adjusted under 35 U.S.C. 154(b) by 952 days.

(21) Appl. No.: 11/689,199

(22) Filed: Mar. 21, 2007

(65) Prior Publication Data
US 2008/0006338 A1 Jan. 10, 2008

Related U.S. Application Data

(60) Provisional application No. 60/784,258, filed on Mar. 21, 2006.

(51) Int. Cl.
*B32B 1/08* (2006.01)
*B28B 23/08* (2006.01)

(52) U.S. Cl. ...... 428/36.3; 428/35.7; 138/140; 138/123; 138/125; 138/DIG. 7

(58) Field of Classification Search ............... 428/35.7, 428/36.3; 138/140, 123, 125, DIG. 7
See application file for complete search history.

(56) References Cited

U.S. PATENT DOCUMENTS

| | | |
|---|---|---|
| 87,993 A | 3/1869 | Weston |
| 396,176 A | 1/1889 | Simpson |
| 418,906 A | 1/1890 | Bosworth |
| 482,181 A | 9/1892 | Kellom |
| 646,887 A | 4/1900 | Stowe et al. |
| 749,633 A | 1/1904 | Seeley |
| 1,234,812 A | 7/1917 | Simmmons |
| 1,793,455 A | 2/1931 | Buchanan |
| 1,890,290 A | 12/1932 | Hargreaves |
| 1,930,285 A | 10/1933 | Robinson |
| 2,464,416 A | 3/1949 | Raybould |
| 2,467,520 A | 4/1949 | Brubaker |
| 2,481,001 A | 9/1949 | Burckle |
| 2,624,366 A | 1/1953 | Pugh |
| 2,648,720 A | 8/1953 | Alexander |
| 2,690,769 A | 10/1954 | Brown |
| 2,725,713 A | 12/1955 | Blanchard |
| 2,750,569 A | 6/1956 | Moon |
| 2,810,424 A | 10/1957 | Swartswelter et al. |
| 2,973,975 A | 3/1961 | Ramberg et al. |
| 2,991,093 A | 7/1961 | Guarnaschelli |

(Continued)

FOREIGN PATENT DOCUMENTS
BE 559688 8/1957
(Continued)

OTHER PUBLICATIONS

"Introduction to Physical Polymer Science 3rd Edition" Sperling, L.H., Wiley-Interscience, New York, NY, 2001, p. 100.*

(Continued)

*Primary Examiner* — Michele L Jacobson
(74) *Attorney, Agent, or Firm* — Goodwin Procter LLP (57) ABSTRACT

A spoolable pipe is disclosed, the spoolable pipe having an internal pressure barrier formed about a longitudinal axis, and a reinforcing layer(s) enclosing the internal pressure barrier that includes a solid hydrocarbon matrix. The pipe can also include an energy conductor(s) integrated with and/or located between the internal pressure barrier and/or the reinforcing layer(s).

15 Claims, 7 Drawing Sheets

U.S. PATENT DOCUMENTS

| | | | |
|---|---|---|---|
| 3,086,369 A | 4/1963 | Brown | |
| 3,116,760 A | 1/1964 | Matthews | |
| 3,170,137 A | 2/1965 | Brandt | |
| 3,277,231 A | 10/1966 | Downey et al. | |
| 3,306,637 A | 2/1967 | Press et al. | |
| 3,334,663 A | 8/1967 | Peterson | |
| 3,379,220 A | 4/1968 | Kiuchi at al. | |
| 3,390,704 A | 7/1968 | Woodell | |
| 3,477,474 A | 11/1969 | Mesler | |
| 3,507,412 A | 4/1970 | Carter | |
| 3,522,413 A | 8/1970 | Chrow | |
| 3,554,284 A | 1/1971 | Nystrom | |
| 3,579,402 A | 5/1971 | Goldsworthy at al. | |
| 3,589,135 A | 6/1971 | Ede et al. | |
| 3,589,752 A | 6/1971 | Spencer et al. | |
| 3,604,461 A | 9/1971 | Matthews | |
| 3,606,396 A | 9/1971 | Prosdocimo et al. | |
| 3,606,402 A | 9/1971 | Medney | |
| 3,677,978 A | 7/1972 | Dowbenko at al. | |
| 3,685,860 A | 8/1972 | Schmidt | |
| 3,692,601 A | 9/1972 | Goldsworthy at al. | |
| 3,696,332 A | 10/1972 | Dickson, Jr. et al. | |
| 3,700,519 A | 10/1972 | Carter | |
| 3,701,489 A | 10/1972 | Goldsworthy et al. | |
| 3,728,187 A | 4/1973 | Martin | |
| 3,730,229 A | 5/1973 | D'Onofrio | |
| 3,734,421 A | 5/1973 | Karlson et al. | |
| 3,738,637 A | 6/1973 | Goldsworthy et al. | |
| 3,740,285 A | 6/1973 | Goldsworthy at al. | |
| 3,744,016 A | 7/1973 | Davis | |
| 3,769,127 A | 10/1973 | Goldsworthy at al. | |
| 3,773,090 A | 11/1973 | Ghersa et al. | |
| 3,776,805 A | 12/1973 | Hansen | |
| 3,783,060 A | 1/1974 | Goldsworthy at al. | |
| 3,814,138 A | 6/1974 | Courtot | |
| 3,817,288 A | 6/1974 | Ball | |
| 3,828,112 A | 8/1974 | Johansen et al. | |
| 3,856,052 A | 12/1974 | Feucht | |
| 3,860,040 A | 1/1975 | Sullivan | |
| 3,860,742 A | 1/1975 | Medney | |
| 3,901,281 A | 8/1975 | Morrisey | |
| 3,907,335 A | 9/1975 | Burge et al. | |
| 3,913,624 A | 10/1975 | Ball | |
| 3,933,180 A | 1/1976 | Carter | |
| 3,956,051 A | 5/1976 | Carter | |
| 3,957,410 A | 5/1976 | Goldsworthy et al. | |
| 3,960,629 A | 6/1976 | Goldsworthy | |
| 3,974,862 A | 8/1976 | Fuhrmann et al. | |
| 3,980,325 A | 9/1976 | Robertson | |
| RE29,112 E | 1/1977 | Carter | |
| 4,032,177 A | 6/1977 | Anderson | |
| 4,048,807 A | 9/1977 | Ellers et al. | |
| 4,053,343 A | 10/1977 | Carter | |
| 4,057,610 A | 11/1977 | Goettler et al. | |
| 4,095,865 A | 6/1978 | Denison et al. | |
| 4,108,701 A | 8/1978 | Stanley | |
| 4,111,469 A | 9/1978 | Kavick | |
| 4,114,393 A | 9/1978 | Engle, Jr. et al. | |
| 4,125,423 A | 11/1978 | Goldsworthy | |
| 4,133,972 A | 1/1979 | Andersson et al. | |
| 4,137,949 A | 2/1979 | Linko, III et al. | |
| 4,139,025 A | 2/1979 | Carlstrom et al. | |
| 4,190,088 A | 2/1980 | Lalikos et al. | |
| 4,200,126 A | 4/1980 | Fish | |
| 4,220,381 A | 9/1980 | van der Graaf et al. | |
| 4,226,446 A | 10/1980 | Burrington | |
| 4,241,763 A | 12/1980 | Antal et al. | |
| 4,248,062 A | 2/1981 | McLain et al. | |
| 4,261,390 A | 4/1981 | Belofsky | |
| 4,273,160 A | 6/1981 | Lowles | |
| 4,303,263 A | 12/1981 | Legris | |
| 4,303,457 A | 12/1981 | Johansen et al. | |
| 4,306,591 A | 12/1981 | Arterburn | |
| 4,308,999 A | 1/1982 | Carter | |
| 4,336,415 A | 6/1982 | Walling | |
| 4,351,364 A | 9/1982 | Cocks et al. | |
| 4,380,252 A | 4/1983 | Gray et al. | |
| 4,402,346 A | 9/1983 | Cheetham et al. | |
| 4,421,806 A * | 12/1983 | Marks et al. | 428/34.5 |
| 4,422,801 A | 12/1983 | Hale et al. | |
| 4,445,734 A | 5/1984 | Cunningham | |
| 4,446,892 A | 5/1984 | Maxwell et al. | |
| 4,447,378 A | 5/1984 | Gray et al. | |
| 4,463,779 A | 8/1984 | Wink et al. | |
| 4,488,577 A | 12/1984 | Shilad et al. | |
| 4,507,019 A | 3/1985 | Thompson | |
| 4,515,737 A | 5/1985 | Karino et al. | |
| 4,522,058 A | 6/1985 | Ewing | |
| 4,522,235 A | 6/1985 | Kluss et al. | |
| 4,530,379 A | 7/1985 | Policelli | |
| 4,556,340 A | 12/1985 | Morton | |
| 4,567,916 A | 2/1986 | Antal et al. | |
| 4,578,675 A | 3/1986 | MacLeod | |
| 4,606,378 A | 8/1986 | Meyer et al. | |
| 4,627,472 A | 12/1986 | Goettler et al. | |
| 4,657,795 A | 4/1987 | Foret et al. | |
| 4,681,169 A | 7/1987 | Brookbank, III | |
| 4,700,751 A | 10/1987 | Fedrick | |
| 4,712,813 A | 12/1987 | Passerell et al. | |
| 4,728,224 A | 3/1988 | Salama et al. | |
| 4,741,795 A | 5/1988 | Grace et al. | |
| 4,758,455 A | 7/1988 | Campbell et al. | |
| 4,789,007 A | 12/1988 | Cretel et al. | |
| 4,842,024 A | 6/1989 | Palinchak | |
| 4,844,516 A | 7/1989 | Baker | |
| 4,849,668 A | 7/1989 | Crawley et al. | |
| 4,859,024 A | 8/1989 | Rahman | |
| 4,903,735 A | 2/1990 | Delacour et al. | |
| 4,913,657 A | 4/1990 | Naito et al. | |
| 4,936,618 A | 6/1990 | Sampa et al. | |
| 4,941,774 A | 7/1990 | Harmstorf et al. | |
| 4,942,903 A | 7/1990 | Jacobsen et al. | |
| 4,972,880 A | 11/1990 | Strand | |
| 4,992,787 A | 2/1991 | Helm | |
| 4,995,761 A | 2/1991 | Barton | |
| 5,048,572 A | 9/1991 | Levine | |
| 5,077,107 A | 12/1991 | Kaneda et al. | |
| 5,090,741 A | 2/1992 | Yokomatsu et al. | |
| 5,097,870 A | 3/1992 | Williams | |
| 5,156,206 A | 10/1992 | Cox | |
| 5,170,011 A | 12/1992 | Martucci | |
| 5,172,765 A | 12/1992 | Sas-Jaworsky et al. | |
| 5,176,180 A | 1/1993 | Williams et al. | |
| 5,182,779 A | 1/1993 | D'Agostino et al. | |
| 5,184,682 A | 2/1993 | Delacour et al. | |
| 5,188,872 A | 2/1993 | Quigley | |
| 5,209,136 A | 5/1993 | Williams | |
| 5,222,769 A | 6/1993 | Kaempen | |
| 5,261,462 A | 11/1993 | Wolfe et al. | |
| 5,265,648 A | 11/1993 | Lyon | |
| 5,285,008 A | 2/1994 | Sas-Jaworsky et al. | |
| 5,285,204 A | 2/1994 | Sas-Jaworsky | |
| 5,330,807 A | 7/1994 | Williams | |
| 5,332,269 A | 7/1994 | Homm | |
| 5,334,801 A | 8/1994 | Mohn et al. | |
| 5,346,658 A | 9/1994 | Gargiulo | |
| 5,348,088 A | 9/1994 | Laflin et al. | |
| 5,348,096 A | 9/1994 | Williams | |
| 5,351,752 A | 10/1994 | Wood et al. | |
| RE34,780 E | 11/1994 | Trenconsky et al. | |
| 5,364,130 A | 11/1994 | Thalmann | |
| 5,394,488 A | 2/1995 | Fernald et al. | |
| 5,395,913 A | 3/1995 | Bottcher et al. | |
| 5,398,729 A | 3/1995 | Spurgat | |
| 5,416,724 A | 5/1995 | Savic | |
| 5,426,297 A | 6/1995 | Dunphy et al. | |
| 5,428,706 A | 6/1995 | Lequeux et al. | |
| 5,435,867 A | 7/1995 | Wolfe et al. | |
| 5,437,311 A | 8/1995 | Reynolds | |
| 5,437,899 A * | 8/1995 | Quigley | 428/35.7 |
| 5,443,099 A | 8/1995 | Chaussepied et al. | |
| 5,452,923 A | 9/1995 | Smith | |
| RE35,081 E | 11/1995 | Quigley | |
| 5,469,916 A | 11/1995 | Sas-Jaworsky et al. | |
| 5,472,764 A | 12/1995 | Kehr et al. | |
| 5,499,661 A | 3/1996 | Odru et al. | |
| 5,524,937 A | 6/1996 | Sides, III et al. | |

| | | | | | |
|---|---|---|---|---|---|
| 5,525,698 A | 6/1996 | Bottcher et al. | 2004/0096614 A1 | 5/2004 | Quigley et al. |
| 5,538,513 A | 7/1996 | Okajima et al. | 2004/0265524 A1* | 12/2004 | Wideman et al. ............ 428/35.7 |
| 5,551,484 A | 9/1996 | Charboneau | 2005/0189029 A1 | 9/2005 | Quigley et al. |
| 5,558,375 A | 9/1996 | Newman | 2007/0125439 A1 | 6/2007 | Quigley et al. |
| 5,622,211 A | 4/1997 | Martin et al. | 2007/0154269 A1 | 7/2007 | Quigley et al. |
| 5,641,956 A | 6/1997 | Vengsarkar et al. | 2008/0006337 A1 | 1/2008 | Quigley et al. |
| 5,671,811 A | 9/1997 | Head et al. | 2008/0006338 A1 | 1/2008 | Wideman et al. |
| 5,683,204 A | 11/1997 | Lawther et al. | 2008/0014812 A1 | 1/2008 | Quigley et al. |
| 5,730,188 A | 3/1998 | Kalman et al. | 2008/0185042 A1 | 8/2008 | Feechan et al. |
| 5,755,266 A | 5/1998 | Aanonsen et al. | 2008/0210329 A1 | 9/2008 | Quigley et al. |
| 5,758,990 A | 6/1998 | Davies et al. | 2009/0090460 A1* | 4/2009 | Wideman et al. ........ 156/244.11 |
| 5,795,102 A | 8/1998 | Corbishley et al. | 2009/0107558 A1 | 4/2009 | Quigley et al. |
| 5,797,702 A | 8/1998 | Drost et al. | 2009/0173406 A1* | 7/2009 | Quigley et al. ............... 138/129 |
| 5,798,155 A | 8/1998 | Yanagawa et al. | 2009/0278348 A1 | 11/2009 | Brotzell et al. |
| 5,804,268 A | 9/1998 | Mukawa et al. | 2010/0101676 A1* | 4/2010 | Quigley et al. ............... 138/137 |
| 5,828,003 A | 10/1998 | Thomeer et al. | | | |
| 5,875,792 A | 3/1999 | Campbell, Jr. et al. | FOREIGN PATENT DOCUMENTS | | |
| 5,908,049 A | 6/1999 | Williams et al. | CH | 461199 | 8/1968 |
| 5,913,337 A | 6/1999 | Williams et al. | DE | 1959738 | 6/1971 |
| 5,921,285 A | 7/1999 | Quigley et al. | DE | 3603597 | 8/1987 |
| 5,933,945 A | 8/1999 | Thomeer et al. | DE | 4040400 A1 | 8/1992 |
| 5,950,651 A | 9/1999 | Kenworthy et al. | DE | 4214383 C1 | 9/1993 |
| 5,951,812 A | 9/1999 | Gilchrist, Jr. | EP | 0024512 | 3/1981 |
| 5,984,581 A | 11/1999 | McGill et al. | EP | 0203887 | 12/1986 |
| 5,988,702 A | 11/1999 | Sas-Jaworsky | EP | 0203887 A2 | 12/1986 |
| 6,004,639 A | 12/1999 | Quigley et al. | EP | 352148 | 1/1990 |
| 6,016,845 A | 1/2000 | Quigley et al. | EP | 0427306 A2 | 5/1991 |
| 6,032,699 A | 3/2000 | Cochran et al. | EP | 0503737 A1 | 9/1992 |
| 6,066,377 A | 5/2000 | Tonyali et al. | EP | 505815 A2 | 9/1992 |
| 6,093,752 A | 7/2000 | Park et al. | EP | 0536844 A1 | 4/1993 |
| 6,136,216 A | 10/2000 | Fidler et al. | EP | 0681085 A2 | 11/1995 |
| 6,148,866 A | 11/2000 | Quigley et al. | EP | 0854029 A2 | 7/1998 |
| 6,209,587 B1 | 4/2001 | Hsich et al. | EP | 0953724 A2 | 11/1999 |
| 6,220,079 B1 | 4/2001 | Taylor et al. | EP | 0970980 | 1/2000 |
| 6,286,558 B1 | 9/2001 | Quigley et al. | EP | 0981992 A1 | 3/2000 |
| 6,315,002 B1 | 11/2001 | Antal et al. | FR | 989204 | 9/1951 |
| 6,328,075 B1 | 12/2001 | Furuta et al. | GB | 225599 A | 12/1924 |
| 6,334,466 B1 | 1/2002 | Jani et al. | GB | 219300 A | 1/1925 |
| 6,357,485 B2 | 3/2002 | Quigley et al. | GB | 227009 A | 1/1925 |
| 6,357,966 B1 | 3/2002 | Thompson et al. | GB | 553110 | 5/1943 |
| 6,361,299 B1 | 3/2002 | Quigley et al. | GB | 809097 | 2/1959 |
| 6,372,861 B1 | 4/2002 | Schillgalies et al. | GB | 909187 | 10/1962 |
| 6,390,140 B2 | 5/2002 | Niki et al. | GB | 956500 | 4/1964 |
| 6,402,430 B1 | 6/2002 | Guesnon et al. | GB | 1297250 | 11/1972 |
| 6,422,269 B1 | 7/2002 | Johansson et al. | GB | 2103744 A | 2/1983 |
| 6,461,079 B1 | 10/2002 | Beaujean et al. | GB | 2365096 | 2/2002 |
| 6,470,915 B1 | 10/2002 | Enders et al. | JP | 163 592 | 6/1990 |
| 6,532,994 B1 | 3/2003 | Enders et al. | WO | WO-8704768 A1 | 8/1987 |
| 6,604,550 B2 | 8/2003 | Quigley et al. | WO | WO-9113925 A1 | 9/1991 |
| 6,620,475 B1* | 9/2003 | Reynolds et al. ............. 428/36.3 | WO | WO-9221908 A1 | 12/1992 |
| 6,631,743 B2 | 10/2003 | Enders et al. | WO | WO-9307073 A1 | 4/1993 |
| 6,634,387 B1 | 10/2003 | Glejbøl et al. | WO | WO-93/19927 | 10/1993 |
| 6,634,388 B1 | 10/2003 | Taylor et al. | WO | WO-95/02782 A1 | 1/1995 |
| 6,663,453 B2 | 12/2003 | Quigley et al. | WO | WO-97/12115 A2 | 4/1997 |
| 6,706,348 B2 | 3/2004 | Quigley et al. | WO | WO-99/19653 A1 | 4/1999 |
| 6,746,737 B2* | 6/2004 | Debalme et al. ............. 428/34.6 | WO | WO-0031458 A1 | 6/2000 |
| 6,764,365 B2 | 7/2004 | Quigley et al. | | | |
| 6,787,207 B2* | 9/2004 | Lindstrom et al. ......... 428/36.91 | OTHER PUBLICATIONS | | |
| 6,803,082 B2* | 10/2004 | Nichols et al. ............... 428/35.7 | | | |
| 6,807,989 B2 | 10/2004 | Enders et al. | | | |
| 6,857,452 B2 | 2/2005 | Quigley et al. | | | |
| 6,902,205 B2 | 6/2005 | Bouey et al. | | | |
| 6,978,804 B2 | 12/2005 | Quigley et al. | | | |
| 6,983,766 B2 | 1/2006 | Baron et al. | | | |
| 7,029,356 B2 | 4/2006 | Quigley et al. | | | |
| 7,080,667 B2 | 7/2006 | McIntyre et al. | | | |
| 7,152,632 B2 | 12/2006 | Quigley et al. | | | |
| 7,234,410 B2 | 6/2007 | Quigley et al. | | | |
| 7,243,716 B2 | 7/2007 | Denniel et al. | | | |
| 7,285,333 B2* | 10/2007 | Wideman et al. ............. 428/451 | | | |
| 7,498,509 B2 | 3/2009 | Brotzell et al. | | | |
| 7,523,765 B2* | 4/2009 | Quigley et al. ............... 138/129 | | | |
| 2001/0006712 A1 | 7/2001 | Hibino et al. | | | |
| 2001/0013669 A1* | 8/2001 | Cundiff et al. ................ 264/103 | | | |
| 2002/0094400 A1* | 7/2002 | Lindstrom et al. ......... 428/36.91 | | | |
| 2002/0119271 A1 | 8/2002 | Quigley et al. | | | |
| 2002/0185188 A1 | 12/2002 | Quigley et al. | | | |
| 2003/0087052 A1* | 5/2003 | Wideman et al. ............. 428/36.4 | | | |
| 2004/0052997 A1* | 3/2004 | Santo ............................ 428/36.3 | | | |

Williams, J.G., "Oil Industry Experiences with Fiberglass Components," Offshore Technology Conference, 1987, pp. 211-220.

Austigard E. and R. Tomter ; "Composites Subsea: Cost Effective Products; an Industry Challenge ", Subsea 94 International Conference, the 1994 Report on Subsea Engineering: The Continuing Challenges.

Connell Mike et al.; "Coiled Tubing: Application for Today's Challenges", Petroleum Engineer International, pp. 18-21 (Jul. 1999).

Feechan Mike et al.; "Spoolable Composites Show Promise", The American Oil & Gas Reporter, pp. 44-50 (Sep. 1999).

Fowler Hampton; "Advanced Composite Tubing Usable", The American Oil & Gas Reporter, pp. 76-81 (Sep. 1997).

Fowler Hampton et al.; "Development Update and Applications of an Advanced Composite Spoolable Tubing", Offshore Technology Conference held in Houston Texas from May 4-7, 1998, pp. 157-162.

Hahn H. Thomas and Williams G. Jerry; "Compression Failure Mechanisms in Unidirectional Composites". NASA Technical Memorandum pp. 1-42 (Aug. 1984).

Hansen et al.; "Qualification and Verification of Spoolable High Pressure Composite Service Lines for the Asgard Field Development Project", paper presented at the 1997 Offshore Technology Conference held in Houston Texas from May 5-8, 1997, pp. 45-54.

Haug et al.; "Dynamic Umbilical with Composite Tube (DUCT)", Paper presented at the 1998 Offshore Technology Conference held in Houston Texas from 4th to 7th, 1998; pp. 699-712.

Lundberg et al.; "Spin-off Technologies from Development of Continuous Composite Tubing Manufacturing Process", Paper presented at the 1998 Offshore Technology Conference held in Houston, Texas from May 4-7, 1998 pp. 149-155.

Marker et al.; "Anaconda: Joint Development Project Leads to Digitally Controlled Composite Coiled Tubing Drilling System", Paper presented at the SPEI/COTA, Coiled Tubing Roundtable held in Houston, Texas from Apr. 5-6, 2000, pp. 1-9.

Measures R. M.; "Smart Structures with Nerves of Glass". Prog. Aerospace Sci. 26(4): 289-351 (1989).

Measures et al.; "Fiber Optic Sensors for Smart Structures", Optics and Lasers Engineering 16: 127-152 (1992).

Poper Peter; "Braiding", International Encyclopedia of Composites, Published by VGH, Publishers, Inc., 220 East 23rd Street, Suite 909, New York, NY I0010.

Quigley et al.; "Development and Application of a Novel Coiled Tubing String for Concentric Workover Services", Paper presented at the 1997 Offshore Technology Conference held in Houston, Texas from May 5-8, 1997, pp. 189-202.

Sas-Jaworsky II and Bell Steve "Innovative Applications Stimulate Coiled Tubing Development", World Oil, 217(6): 61 (Jun. 1996).

Sas-Jaworsky II and Mark Elliot Teel; "Coiled Tubing 1995 Update: Production Applications", World Oil, 216 (6): 97 (Jun. 1995 ).

Sas-Jaworsky, A. and J.G. Williams, "Advanced composites enhance coiled tubing capabilities", World Oil, pp. 57-69 (Apr. 1994).

Sas-Jaworsky, A. and J.G. Williams, "Development of a composite coiled tubing for oilfield services", Society of Petroleum Engineers, Spe 26536, pp. 1-11 (1993).

Sas-Jaworsky, A. and J.G. Williams, "Enabling capabilities and potential applications of composite coiled tubing", Proceedings of World Oil's 2nd International Conference on Coiled Tubing Technology, pp. 2-9 (1994).

Sas-Jaworsky II Alex.; "Developments Position CT for Future Prominence", The American Oil & Gas Reporter, pp. 87-92 (Mar. 1996).

Moe Wood T. et al.; "Spoolable, Composite Piping for Chemical and Water Injection and Hydraulic Valve Operation", Proceedings of the 11th International Conference on Offshore Mechanics and Arctic Engineering-I992-, vol. III, Part A—Materials Engineering, pp. 199-207 (1992).

Shuart J. M. et al.; "Compression Behavior of #45o-Dominated Laminates with a Circular Hole or Impact Damage", AIAA Journal 24(1):115-122 (Jan. 1986).

Silverman A. Seth; "Spoolable Composite Pipe for Offshore Applications", Materials Selection & Design pp. 48-50 (Jan. 1997).

Rispler K. et al.; "Composite Coiled Tubing in Harsh Completion/Workover Environments", Paper presented at the SPE GAS Technology Symposium and Exhibition held in Calgary, Alberta, Canada, on Mar. 15-18, 1998, pp. 405-410.

Williams G. J. et al.; "Composite Spoolable Pipe Development, Advancements, and Limitations", Paper presented at the 2000 Offshore Technology Conference held in Houston Texas from May 1-4, 2000, pp. 1-16.

Hartman, D.R., et al., "High Strength Glass Fibers," Owens Coming Technical Paper (Jul. 1996).

International Search Report mailed on Nov. 8, 2005.

* cited by examiner

| Base Hydrocarbon Description | MICROSERE® 5701 is a very light colored, laminating grade, microcrystalline wax. It is recommended where the flexibility, tack and barrier properties of laminating grade microcrystalline wax are required but where very light color is of utmost importance. | PARAFFLEX® 4675A is a special blend of petroleum wax which may be used as a "medium duty" duck defeathering wax. PARAFFLEX® 4675A may also be utilized for specialty wicking applications when a low melting point, tacky consistency will be of benefit. | IGI 2289A is a crude scale paraffin wax derived from petroleum. | IGI 1240A is a fully refined paraffin wax suitable for use in a variety of applications including paper substrates where low MVTR and good machinability are required. |
|---|---|---|---|---|
| Wax Properties | | | | |
| MP | 159 | 139 | 118 | 136 |
| Softness (needle indentation) | 14 | 26 | 85 | 11 |
| Pack Properties | | | | |
| Station Number | 2 | 2 | 2 | 2 |
| Applicator Speed | 25 | 25 | 25 | 25 |
| Yield | 225T | 225T | 225T | 225T |
| L.O.I. % (AFTER DRY) | 14.04 | 11.06 | 12.56 | 9.27 |
| Density Wax | 0.9 | 0.9 | 0.9 | 0.9 |
| Density Glass | 2.56 | 2.56 | 2.56 | 2.56 |
| FVF | 68.28% | 73.87% | 70.99% | 77.48% |
| MVF | 31.72% | 26.13% | 29.01% | 22.52% |
| Qualitative Ranking | 1 | 2 | 2 | 3 |
| Tow Observations | Firm | Medium | Flexible | Clumpy |

FIGURE 7

| CARBON NUMBER | MICROSERE 5701 NORMALS | 7/9/02 10:21:48 AM ISOMERS |
|---|---|---|
| 15 | 0 | 0 |
| 16 | 0 | 0 |
| 17 | 0 | 0 |
| 18 | 0 | 0 |
| 19 | 0 | 0 |
| 20 | 0.012 | 0 |
| 21 | 0.059 | 0 |
| 22 | 0.176 | 0 |
| 23 | 0.376 | 0 |
| 24 | 0.555 | 0.013 |
| 25 | 0.615 | 0.028 |
| 26 | 0.651 | 0.051 |
| 27 | 0.632 | 0.077 |
| 28 | 0.615 | 0.105 |
| 29 | 0.639 | 0.139 |
| 30 | 0.628 | 0.184 |
| 31 | 0.696 | 0.236 |
| 32 | 0.761 | 0.297 |
| 33 | 0.879 | 0.408 |
| 34 | 0.967 | 0.594 |
| 35 | 1.138 | 0.817 |
| 36 | 1.467 | 1.067 |
| 37 | 1.622 | 1.405 |
| 38 | 1.74 | 1.772 |
| 39 | 1.699 | 2.331 |
| 40 | 1.729 | 2.556 |
| 41 | 1.54 | 2.81 |
| 42 | 1.378 | 2.691 |
| 43 | 1.249 | 2.659 |
| 44 | 1.074 | 2.513 |
| 45 | 0.89 | 2.504 |
| 46 | 0.851 | 2.531 |
| 47 | 0.789 | 2.308 |
| 48 | 0.749 | 2.215 |
| 49 | 0.679 | 2.095 |
| 50 | 0.496 | 2.024 |
| 51 | 0.531 | 2.004 |
| 52 | 0.46 | 1.886 |
| 53 | 0.4 | 1.828 |
| 54 | 0.35 | 1.747 |
| 55 | 0.376 | 1.649 |
| 56 | 0.237 | 1.618 |
| 57 | 0.314 | 1.52 |
| 58 | 0.328 | 1.294 |
| 59 | 0.252 | 1.311 |
| 60 | 0.209 | 1.314 |
| 61 | 0.286 | 1.165 |
| 62 | 0.207 | 1.124 |
| 63 | 0.216 | 1.167 |
| 64 | 0.167 | 1.118 |
| 65 | 0.162 | 1.091 |
| TOTAL | 31.846 | 58.266 |
| Mn | 534 | 652 |
| Mw | 565 | 674 |
| Mz | 595 | 695 |

REINFORCING MATRIX FOR SPOOLABLE PIPE

CROSS-REFERENCE TO RELATED APPLICATIONS

This application claims priority to and the benefit of U.S. provisional patent application Ser. No. 60/784,258, filed Mar. 21, 2006, the entirety of which is being incorporated herein by reference in its entirety.

BACKGROUND

Steel pipe is commonly used in the oil and gas industry. This type of pipe may be used in the transport of fluids to or from the well such as oil and gas gathering lines, flow lines, and fluid and gas injection lines which may be installed on the surface or buried. Steel pipe may also be used for downhole applications such as drilling, intervention, or production including drill strings, coiled tubing, production tubing, casing, and velocity and heater strings, and the like. Carbon steels, however, may be susceptible to corrosion by oilfield fluids, such as produced or injected water, brine, and dissolved acids from $CO_2$ or $H_2S$, as well as well work-over fluids such as HCl and HF. Furthermore, steel pipelines, gathering lines or injection lines are usually installed using short (30-40 foot) sections. This requires additional labor and provides the possibility for fluid leakage at each fitting. Such labor intensive installation may also lead to lost revenues if production or transport of the fluids is suspended during the installation.

To resist internal corrosion, steel alloys, non-metallic internal coatings, or fiberglass-reinforced epoxy pipe may be used, but all may still have the disadvantage of being sectional products. In addition, the wall of a fiberglass-reinforced epoxy pipe may be fairly damage intolerant and may require careful handling, installation, and/or use of specific back-fill materials. Damage or cracks in the fiberglass-reinforced epoxy layer can, in some cases, lead to small leaks or "weeping" of the pipe under pressure. In some applications, thermoplastic liners may be used as corrosion protection inside steel pipe, but these liners are susceptible to collapse by permeating gases trapped in the annulus between the liner and the steel pipe if the pressure of the bore is rapidly decreased. Unreinforced thermoplastic pipe, on the other hand, can usually only tolerate relatively low pressures especially at elevated temperatures and in the presence of oilfield fluids.

Thermoplastic lined fiberglass pipe designed for relatively moderate pressure, for example, 0 to about 500 PSI service may have thin walls that may be damage intolerant or may kink or collapse when spooled at moderate spooling strains of about 1-10%. High modulus materials such as epoxies may increase the tendency for the thin-walled pipe to kink or collapse. Materials such as Kevlar may used for reinforcement but may be prohibitively expensive for many applications. Bare fiberglass reinforcement of, for example, a thermoplastic liner may be susceptible to corrosion by water, especially in the presence of dilute acids, bases, or stress. Abrasion of bare fibers against each other during manufacturing, spooling, installation, or operation may cause breakage of glass fibers and reduction of hydrostatic strength. Uneven surfaces of the fibers against a tube liner may cause point loading; gouging of the fibers into the liner may increase the tendency to stress cracking of the liners; individual fibers that can move independently may spread so as to allow the liner to extrude past the fiber reinforcement and rupture. Therefore, there is a need for a low-cost, corrosion resistant, spoolable, reinforced inner-lined pipe for such relatively low pressure applications that is damage tolerant and will not kink when spooled.

SUMMARY

Disclosed is a spoolable pipe comprising a matrix that includes solid matrix with a tensile modulus of less than about 100,000 psi.

For example, a spoolable pipe is disclosed that includes an internal pressure barrier formed about a longitudinal axis; at least one reinforcing layer enclosing the internal pressure barrier and comprising fibers and a solid hydrocarbon matrix, where the solid hydrocarbon matrix is solid at about 25° C., and may also include an external layer enclosing the least one reinforcing layer. The hydrocarbon matrix may comprise hydrocarbons having a molecular weight of less than about 10,000 grams/mole.

In some embodiments, the reinforcing layer includes fibers that comprise glass, an aramid, a carbon, a ceramic, a metal, a mineral, or a polymer, or combinations thereof. A reinforcing layer may comprise at least two plies of fibers, and in some embodiments, at least two plies of fibers may have at least a partial helical orientation relative to the longitudinal axis. Such fibers may be embedded in matrix.

The solid hydrocarbon matrix of a disclosed spoolable tube may comprise up to about 30%, up to about 50%, or even up to about 70% by volume of a reinforcing layer and/or may comprise up to about 15% by weight of a reinforcing layer. For example, the matrix may comprise between about 10% and about 70% by volume. In some embodiments, the solid hydrocarbon matrix may have a tensile strength of less than about 1000 psi. In other embodiments, the permeability of a disclosed hydrocarbon matrix increases with temperature faster than the permeability of an internal pressure barrier or liner increases with temperature.

In some embodiments, the solid hydrocarbon matrix included in the spoolable tube may have a content of at least 10% by weight of hydrocarbons with a molecular weight of less than about 4,000 grams/mole and/or may have a solid hydrocarbon matrix with a molecular weight of about 200 to about 8,000 grams/mole. Contemplated hydrocarbons may include straight-chain alkanes, cycloalkanes, branched alkanes, and/or aliphatic compounds. Hydrocarbons contemplated herein may also include alkenes, alkynes, and aromatic functionalities.

Also disclosed herein is a spoolable pipe that includes an internal pressure barrier formed about a longitudinal axis, at least one reinforcing layer enclosing the internal pressure barrier and comprising fibers and a solid matrix with a tensile modulus between about 10 and 90,000 psi, or about 10 to about 10,000 psi, wherein said reinforcing layer is formed at least by applying to said fibers a substantially liquid matrix composition having a viscosity between about 10 and about 5,000 cPs at 25° C., or between about 10 and about 10,000 cPs at 25° C. In some embodiments, the substantially liquid matrix composition is capable of flowing between the fibers of the reinforcing layer.

The substantially liquid matrix composition may have a viscosity between about 100 and about 1000 cPs. In some embodiments, the substantially liquid matrix composition is an emulsion, a suspension, a colloid, a immiscible fluid blend, or two-phase system, and may further include an emulsifier, tackifier, binder, and/or surfactant. In one embodiment, the substantially liquid matrix is an emulsion. In another embodiment, the substantially liquid matrix comprises a water-based dispersion, e.g. that includes polymer particles. The substantially liquid matrix composition may include at least one of: polyethylene, polyethylene oligomers, polypropylene, polypropylene oligomers, polyolefins, polyolefin oligomers, paraffin waxes, or a grease.

In some embodiments, the substantially liquid matrix composition comprises polymer particles. Such polymer particles may have an average diameter between about 10 nm and about 10 μm.

The internal pressure barrier or liner of a disclosed spoolable tube may comprise at least one of: a metal, and/or a polymer such as a polyolefin, a polyethylene, cross-linked polyethylene, polyvinylidene fluoride, polyamide, polypropylene, polybutylene, polybutadiene, polyvinylchloride, polyethylene terphthalate, or polyphenylene sulfide or combinations thereof. The barrier may have distinct separate layers or may include combinations of materials such as an alloy, blend, copolymer or block polymer. The internal pressure barrier may also include organic or inorganic solids.

In some embodiments, the permeability of a reinforcing layer or hydrocarbon matrix of a disclosed spoolable tube may be higher than the permeability of an internal pressure barrier and/or the permeability of an external layer may be higher than the permeability of the hydrocarbon matrix or a reinforcing layer. In some embodiments, the permeability of an external layer may be less than the permeability of the reinforcing layer or hydrocarbon matrix.

A disclosed spoolable pipe may include an external layer that comprises, for example, at least one of: polyethylene, cross-linked polyethylene, polyvinylidene fluoride, polyamide, polybutylene, polypropylene, polyethylene terphthalate, or polyphenylene sulfide, or a combination thereof, either as distinctly separate layers or as alloys, blends, copolymers, or block copolymers. An exemplary external layer includes a foam that comprises for example, at least one of: a thermoset polymer, a thermoplastic polymer, elastomer, rubber, a closed cell foam, and an open cell foam. The external layer may include organic or inorganic solids. In some embodiments, such an external layer is perforated. Disclosed spoolable pipes may further comprise an energy conductor. In other embodiments, a spoolable pipe disclosed herein may include a fire retardant UV stabilizer, oxidative stabilizer, thermal stabilizer, and/or a pigment.

The disclosed reinforcing material may include fibers which are at least partially coated by said solid hydrocarbon matrix and/or fibers that may be embedded in said solid hydrocarbon matrix.

Also provided herein is a method for producing a spoolable tube comprising: providing an inner layer of said spoolable tube; applying a substantially liquid matrix composition comprising at least one of: polyethylene, polyethylene oligomers, polypropylene, polypropylene oligomers, polyolefins, polyolefin oligomers, a wax, and/or a grease to fibers at a temperature between about 20° C. and about 40° C.; drying or curing said fibers so that a solid matrix composition between the fibers is formed; and winding said tow around said inner layer. The substantially liquid matrix composition may be applied at about 25° C. The applying step may occur substantially during the winding step. In some embodiments, the drying step may occur after, during, or before the winding step.

In another embodiment, a method for producing a spoolable tube is provided that comprises: providing an inner layer of the spoolable tube; applying a hydrocarbon matrix comprising hydrocarbons having an average molecular weight of less than about 20,000 grams/mole to fibers by dissolving the hydrocarbons in a solvent; cooling or evaporating the solvent from said fibers so that a solid hydrocarbon matrix is formed on or around the fibers; and winding said fibers around said inner layer. The hydrocarbon matrix may be applied at about 25° C.

Alternatively, a method for producing a spoolable tube is provide that comprises: providing an inner layer of the spoolable tube; melting a hydrocarbon matrix comprising hydrocarbons having an average molecular weight of less than about 20,000 grams/mole; applying the melted hydrocarbon matrix to fibers; cooling the hydrocarbon matrix so that a solid hydrocarbon matrix is formed on or around the fibers; and winding said fibers around said inner layer. In some embodiments, a substantially solid hydrocarbon matrix composition is a wax. The methods may further comprise forming a tow comprising said fibers. The hydrocarbon matrix composition may be applied at a temperature above its melting point, for example at about 40 to about 150° C.

In some embodiments, the solid hydrocarbon matrix is formed by cross-linking or gelling the hydrocarbons. Such gelling or cross-linking of the hydrocarbon matrix may improve the thermal resistance, chemical resistance, or mechanical properties of the matrix.

The methods include those wherein an applying step occurs substantially in-line with the production of the fibers. The applying step of the disclosed methods may occur, e.g. substantially during the winding step. The cooling or solvent evaporation step may occur after said winding step. In some embodiments, disclosed methods may also include forming a tow comprising said fibers.

DETAILED DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

Disclosed herein is a spoolable tube and methods for making the same, that provides a path for conducting fluids (i.e., liquids and gases) along the length of the spoolable tube. For example, the spoolable tube can transmit fluids down a well hole for operations upon the interior surfaces of the well hole, the spoolable tube can transmit fluids or gases to hydraulic or pneumatic machines operably coupled to the spoolable tube, and/or the spoolable tube can be used to transmit fluids, underwater, underground, or on surface systems from well holes or other equipment to transmission, distribution pipelines or other equipment. Accordingly, the spoolable tube disclosed herein can provide a conduit for powering and controlling hydraulic and/or pneumatic machines, and/or act as a conduit for fluids, for example gases or liquids. In some embodiments, the spoolable tubes disclosed herein are used for relatively low pressure applications, where the pressure of a fluid being transported by a disclosed tube is about 1 to about 1000 psi, or about 10 to about 500 psi. Such spoolable tubes comprise a reinforcing layer that includes a matrix with a tensile modulus of less than 100,000 psi, e.g. a tensile modulus between about 1 and about 90,000 psi, between about 10 and 90,000 psi, between about 100 and about 10,000 psi.

For convenience, before further description, certain terms employed in the specification, examples, and appended claims are collected here. These definitions should be read in light of the reminder of the disclosure and understood as by a person of skill in the art.

The articles "a" and "an" are used herein to refer to one or to more than one (i.e. to at least one) of the grammatical object of the article. By way of example, "an element" means one element or more than one element.

The term "aliphatic" is an art-recognized term and includes linear, branched, and cyclic alkanes, alkenes, or alkynes. In certain embodiments, aliphatic groups in the present disclosure are linear or branched and have from 10 to about 100 carbon atoms, 12 to about 50 carbons, or even 12 to about 35 carbons.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., C1-C30 for straight chain, C3-C30 for branched chain), and alternatively, about 20 or fewer. Likewise, cycloalkyls have from about 3 to about 10 carbon atoms in their ring structure, and alternatively about 5, 6 or 8 carbons in the ring structure.

Moreover, the term "alkyl" (or "lower alkyl") includes both "unsubstituted alkyls" and "substituted alkyls", the latter of which refers to alkyl moieties having substituents replacing a hydrogen on one or more carbons of the hydrocarbon backbone. Such substituents may include, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphonate, a phosphinate, an amino, an amido, an amidine, an imine, a silyl, a cyano, a nitro, an azido, a sulfhydryl, an alkylthio, a sulfate, a sulfonate, a sulfamoyl, a sulfonamido, a sulfonyl, a heterocyclyl, an aralkyl, metals, metal ions, or an aromatic or heteroaromatic moiety. It will be understood by those skilled in the art that the moieties substituted on the hydrocarbon chain may themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CF3, —CN and the like. Exemplary substituted alkyls are described below. Cycloalkyls may be further substituted with alkyls, alkenyls, alkoxys, alkylthios, aminoalkyls, carbonyl-substituted alkyls, —CF3, —CN, and the like.

The term "aralkyl" is art-recognized, and includes alkyl groups substituted with an aryl group (e.g., an aromatic or heteroaromatic group).

The terms "alkenyl" and "alkynyl" are art-recognized, and include unsaturated aliphatic groups analogous in length and possible substitution to the alkyls described above, but that contain at least one double or triple bond respectively.

Unless the number of carbons is otherwise specified, "lower alkyl" refers to an alkyl group, as defined above, but having from one to ten carbons, alternatively from one to about six carbon atoms in its backbone structure. Likewise, "lower alkenyl" and "lower alkynyl" have similar chain lengths.

The term "hydrocarbon" is art-recognized and refers to all permissible compounds having at least one hydrogen and one carbon atom. For example, permissible hydrocarbons include acyclic and cyclic, branched and unbranched, carbocyclic and heterocyclic, aromatic and nonaromatic organic compounds that may be substituted or unsubstituted, for example, alkyl moieties. In some embodiments, hydrocarbons disclosed herein have a molecular weight less than about 50,000, less than about 30,000, less than about 10,000, less than about 5,000, less than about 3,000, or even less than about 2,000 g/mol.

The term 'olefin' refers to unsaturated, aliphatic hydrocarbons. The unsaturated, aliphatic hydrocarbons may be substituted or unsubstituted.

The term "solid" refers to a substance that is resistant to flow, e.g. substantially solid at room temperature (25° C.).

The term "grease" refers to a composition that is organic or inorganic, substantially water-insoluble, and semi-solid at room temperature.

The term "wax" will be understood to encompass any composition that is substantially solid at room temperature, and can be used at a low viscosity or high temperature, and then cooled to room temperature during the formation of a product disclosed herein. A wax melts without significant decomposition at a temperature above about 40° C., for example, with a melting point of about 40° C. to about 120° C. or about 40° C. to about 90° C. Wax may include an organic compound that is substantially carbon and hydrogen based, but may include elements such as oxygen, nitrogen silicon and/or cationic and anionic moieties. Exemplary waxes include fossil waxes such as petroleum waxes, e.g. ozokerite, macrocristalline paraffin waxes, microcrystalline paraffin waxes, montan waxes, plant waxes such as carnauba wax, candelilla wax and the like, waxes that include silicon or silicone, waxes of animal origin such as beeswax, lanolin and the like, and also semisynthetic waxes such as amide waxes, e.g., distearylethylenediamine, and also fully synthetic waxes such as polyolefin waxes, e.g., polyethylene and polypropylene waxes, Fischer-Tropsch waxes, fluorinated waxes such as polytetrafluoroethylene and polyethylene-polytetrafluoroethylene copolymers, and also polyoxidates of Fischer-Tropsch waxes and of polyolefin waxes. Waxes include compounds that are esters of long-chain aliphatic alcohols (for example $C_{16}$ and above) with long-chain fatty acids. Such esters and acids are preferably straight-chain compounds, and may be saturated or unsaturated. Examples of acids which may be used include stearic acid, palmitic acid and oleic acid and mixtures of two or more thereof. Waxes derived from long-chain aliphatic compounds may include hydrocarbons. In addition to esters of the long-chain acids as described above there may be mentioned salts such as, for example, aluminium stearate.

The term "substituted" is art-recognized and refers to all permissible substituents of organic or inorganic compounds. In a broad aspect, the permissible substituents include acyclic and cyclic, branched and unbranched, carbocyclic and heterocyclic, aromatic and nonaromatic substituents of organic or inorganic compounds. Illustrative substituents include, for example, those described herein above. The permissible substituents may be one or more and the same or different for appropriate organic compounds. For purposes of this disclosure, the heteroatoms such as silicon may have hydrogen substituents, halogen substituents, and/or any permissible substituents of organic or inorganic compounds described herein which satisfy the valences of the heteroatoms. This disclosure is not intended to be limited in any manner by the permissible substituents of organic or inorganic compounds.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction.

The definition of each expression, e.g. alkyl, m, n, R, X, etc., when it occurs more than once in any structure, is intended to be independent of its definition elsewhere in the same structure unless otherwise indicated expressly or by the context.

In one aspect, this disclosure provides for a material, such as a reinforcing layer in a spoolable pipe, that includes fibers and a hydrocarbon matrix. The hydrocarbon matrix may be solid at room temperature, but have a lower viscosity at a higher temperature so that such matrix can be applied in liquid form to, for example, fibers. Alternatively, the matrix may be formed, at least in part, by applying a substantially liquid matrix composition having a viscosity of between about 10 and about 10,000 cPs at 25° C.

The hydrocarbon matrix may include hydrocarbons such as aliphatic compounds, e.g straight-chain alkanes, cycloalkanes, or branched alkanes. In other embodiments, the hydrocarbon matrix may include a wax, such as defined above, or a grease, for example a silicone grease, elastomers, rubbers such as butadiene acrylonitrile (NBR) or hydrogenated nitrile butadiene rubber, tars, asphalts, polymer solutions or blends, emulsions, gels or combinations of these or other hydrocarbons disclosed herein.

Exemplary hydrocarbons include those compounds that comprise the structure where x may independently for each occurrence be an integer from 0 to 2; R may independently for each occurrence be hydrogen, alkyl, alkenyl, alkynyl, aryl, alkoxy, hydroxyl, halogen, amino, nitro, sulfhydryl, amido, phosphonate, phosphinate, silyl, carboxyl, ether, alkylthio, ester, a metal or metal ion, or the like, and n is an integer from about 5 to about 300, about 7 to about 100, about 12 to about 25, or about 15 to about 30.

Such hydrocarbons that may be included in a matrix may have a molecular weight or weight average molecular weight of less than about 50,000, less than about 30,000, less than about 20,000, or even less than about 10,000 g/mol. For example, a solid hydrocarbon contemplated herein may have a molecular weight of about 200 to about 8,000 g/mol, about 400 to about 12,000 g/mol, or about 250 to about 15,000 g/mol. In some embodiments, a solid hydrocarbon matrix may have between about 10 and about 2000 repeating monomeric units, e.g. about 10 to about 1500, or about 100 to about 1500 repeating units. A hydrocarbon matrix may have a content of at least about 5%, at least about 10%, or even at least about 20% by weight of hydrocarbons with a molecular weight of less than for example 20,000, less than about 10,000 or even less that about 5,000, or less that about 4,000 grams/mol. A solid hydrocarbon matrix or wax may have a weight average molecular weight falling within the ranges set forth above. For example, a solid hydrocarbon matrix may include such waxes as Microsere 5701.

For example, an elemental analysis of a such a substantially hydrocarbon matrix may include $C_xH_yA_zR_mR'_mR''_mM_n$ where R, R' and R" may each independently include a halogen such as F, Cl or I; A is a heteroatom; M is a metal and where x is about 1.0; y may be about 1.0-3.0 inclusive; z is about 0-3.0; m is about 0-3.0 and n is about 0-1.0. In some embodiments, x is about 1.0; y is about 1.5 to 2; z is <1; m is <1 and n is <1. There may also be elemental compositions that include more than one type of heteroatom, halogen or metal.

In an exemplary embodiment, a hydrocarbon matrix may have a melting point above about 40° C., for example, a hydrocarbon matrix may have a melting point between about 35° C. and 120° C., or between about 40° C. and about 100° C., or between about 40° C. and about 80° C.

Alternatively, the matrix may include a polymer such as a thermoplastic, e.g. polyethylene or polyethylene oligomers, polypropylene, polypropylene oligomers, polyolefins, and/or polyolefin oligomers. A contemplated reinforcing layer comprises a matrix that may include a thermoplastic polymer, with a molecular weight, or average molecular weight, above e.g. 10,000 g/mol, or above about 20,000 g/mol. Such solid matrix may formed for example by providing a substantially liquid matrix composition that includes such a polymer, a wax, and/or a grease, wherein the liquid matrix forms a solid after a period of time, e.g. by drying, curing and/or crosslinking. The substantially liquid matrix, in certain embodiments, has a viscosity less than about 1000 cPs, e.g. a viscosity between about 100 and about 1000, between about 150 and about 800 cPs at 25° C. A low viscosity may allow the substantially liquid matrix composition to flow between small diameter fibers of the reinforcing layer, and/or may facilitate filament winding.

Such a substantially liquid matrix may be in the form of an emulsion, a suspension, a colloid, an immiscible fluid blend, an ionic liquid, and/or a two phase system. A substantially liquid matrix can comprise a solution of hydrocarbons in an appropriate solvent. In some embodiments, a substantially liquid matrix may be an emulsion, e.g. an oil-in-water emulsion or an water-in oil emulsion. An emulsion may have both the dispersed and continuous phase substantially liquid. In an embodiment, the emulsion comprises polymer particles, e.g. particles with an average diameter of about 10 nm to about 100 μm, or about 100 nm to about 1 μm. A contemplated emulsion may include an emulsifier, tackifier, binder, and/or a surfactant.

For example, a substantially liquid composition for use in forming a solid matrix may be a latex matrix or dispersion, e.g. a water-based dispersion of sub-micron polymer particles. When the water evaporates, the polymer particles may coalesce to form a solid, e.g. a solid film. Alternatively, a substantially liquid composition may include an anionic or cationic additive or composition which upon evaporation, drying, curing, or gelling are capable of form a solid matrix. For example, such composition may comprise amine or ammonium moieties. In some embodiments, a substantially liquid composition may include inorganic solids.

A reinforcing material or layer may include fibers. Such a layer may include fibers in one or more plies, or the fibers may be randomly oriented, or the material may include fibers in both configurations.

In one embodiment, the reinforcing layer can include two plies, which can optionally be counter-wound unidirectional plies. Such plies can be wound or formed around a inner object, for example, an inner pipe layer. The reinforcing layer (s) can include two plies, which can optionally be wound in about equal but opposite helical directions. In other embodiments, the reinforcing material can include three, four, five, six, seven or eight, or more plies of fibers, each ply independently wound, for example, in a helical orientation relative to the longitudinal axis. Plies may have a different helical orientation with respect to another ply, or may have the same helical orientation. The reinforcing layer may include plies and/or fibers that have a partially and/or a substantially axial orientation. The reinforcing layer may include plies of fibers with another material disposed between each ply, such as for example, an abrasion resistant material disposed between each ply, or optionally disposed between only certain plies. In some embodiments, an abrasion resistant layer is disposed between plies that have a different helical orientation.

When the reinforcing material or layer is part of a device or object with a longitudinal axis, e.g. a spoolable pipe, such reinforcing layers can include fibers having at least a partially helical orientation relative to this axis. The fibers may have a helical orientation between substantially about thirty degrees and substantially about seventy degrees relative to the longitudinal axis. For example, the fibers may be counterwound with a helical orientation of about ±40°, ±45°, ±50°, ±55°, and/or ±60°. The reinforcing layer may include fibers having multiple, different orientations about the longitudinal axis.

Exemplary fibers include but are not limited to graphite, glass, carbon, KEVLAR, aramid, fiberglass, boron, polyester fibers, polyamide, ceramic, inorganic or organic polymer fibers, mineral based fibers such as basalt fibers, metal fibers, and wire. For example, fibers can include glass fibers that comprise e-glass, e-cr glass, Advantex®, s-glass, d-glass, borosilicate glass, soda-lime glass or a corrosion resistant glass.

The fibers can include structural fibers and flexible yarn components. The structural fibers can be formed of carbon, aramid, thermoplastic, polyester, polyamide, carbon, KEVLAR, inorganic compounds such as basalt or boron, metal and/or glass. The flexible yarn components, or braiding fibers, can be formed of either polyamide, polyester, aramid, thermoplastic, carbon, KEVLAR, boron, inorganic compounds such as basalt or boron, glass and/or ceramic. The fibers included in a reinforcing material can be woven, braided, knitted, stitched, circumferentially, axially or hoop wound, helically wound, and/or other textile form to provide an orientation as provided herein (e.g., in an embodiment, with an orientation between substantially about thirty degrees and substantially about seventy degrees relative to a longitudinal axis of an object). The fibers can be biaxially or triaxially braided.

The reinforcing layer or material contemplated herein may include fibers that are at least partially coated by a disclosed matrix, and may include fibers that are embedded within a matrix, or may include fibers with a matrix between at least some of the fibers, or may include a combination. The reinforcing material may comprise up to about 30% of matrix by volume, up to about 50% of matrix by volume, up to about 70% of matrix by volume, or even up to about 80% or higher by volume.

The reinforcing material contemplated herein may comprise more than about 5%, more than about 10%, more than about 20% or even more than about 30% by weight of solid hydrocarbon matrix.

As contemplated herein, the disclosed reinforcing material may also include polymers such as thermoplastics, for example polyolefins. For example, a reinforcing material may also include polyethylene such as low density polyethylene, medium density polyethylene, linear low density polyethylene, high density polyethylene, ultra-high molecular weight polyethylene, polypropylene, cross-linked polyethylene, polybutylene, polybutadiene, or polyvinylchloride. The reinforcing material may further include pigments, plasticizers, flame retardants, UV stabilizers, thermal stabilizers, oxidative stabilizers, water resistant materials, water absorbing materials, hydrocarbon resistant materials, hydrocarbon absorbent materials, permeation resistant materials, permeation facilitating materials, lubricants, fillers, compatibilizing agents, coupling agents such as silane coupling agents, surface modifiers, conductive materials, thermal insulators or other additives, or a combination of these.

Also contemplated herein are one or more methods for fabricating or making a reinforcing material or layer. Such a reinforcing material or layer may be fabricated by applying a composition comprising hydrocarbon that is substantially in liquid form, for example, a disclosed hydrocarbon at a temperature greater than about 40° C., or a substantially liquid composition such as an emulsion which may be e.g. at about room temperature to fibers, for example, to a ribbon or bundle of fibers, to form a material. If a hydrocarbon is applied at a temperature greater than 40° C., the reinforcing layer or material can then be cooled to room temperature, forming a matrix. If a substantially liquid composition is applied at, e.g. room temperature, the composition can be e.g. dried to form a solid matrix. The hydrocarbon and/or substantially liquid composition may be applied in line with fiber manufacture or in a secondary process, or it may be applied during the fiber winding operation of the tubing manufacture. Disclosed matrix components such as hydrocarbons can also be applying in liquid form by for example, forming an emulsion of hydrocarbons in water and then applying the composition to fibers. Such application may be followed by evaporation, drying, gelling, curing, or polymerization of the liquid. The matrix may be applied in-line with fiber manufacture, e.g. as part of the fiber sizing or as a coating, and/or applied in a secondary fiber coating operation to form a coated tow, strand, ribbon, rope, yarn or the like. It may also be applied in-line with a filament winding operation.

Figure 1:
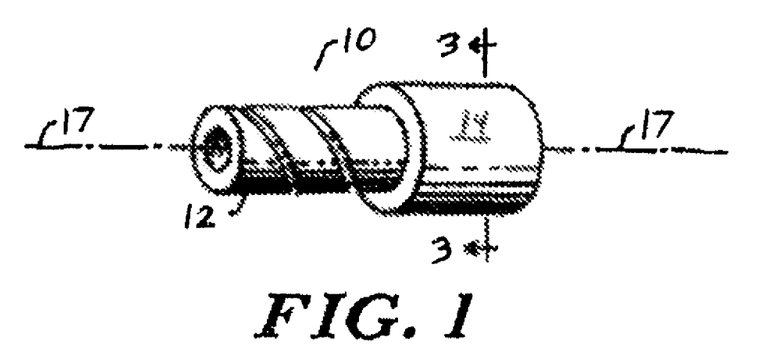
FIG. 1 is a side view, partially broken away, of a spoolable tube that includes an inner pressure barrier and a reinforcing layer.

FIG. 1 illustrates a spoolable tube 10 constructed of an internal pressure barrier 12 and a reinforcing layer 14. The spoolable tube can be generally formed along a longitudinal axis 17. Although illustrated in FIG. 1 as having a circular cross-section, the disclosed spoolable tube can have a variety of tubular cross-sectional shapes, including but not limited to circular, oval, rectangular, square, polygonal, and/or others.

The internal pressure barrier 12, otherwise referred to as a liner or a fluid barrier, can serve as a pressure containment member to resist leakage of internal fluids from within the spoolable tube 10. In some embodiments, the internal pressure barrier 12 can include a polymer, a thermoset plastic, a thermoplastic, an elastomer, a rubber, a co-polymer, and/or a composite. The composite can include a filled polymer and a nano-composite, a polymer/metallic composite, and/or a metal (e.g., steel, copper, and/or stainless steel). Accordingly, an internal pressure barrier 12 can include one or more of a polyethylene, a cross-linked polyethylene, a polybutylene, a polyvinylidene fluoride, a polyamide, polyethylene terphthalate, polyphenylene sulfide and/or a polypropylene, or combinations of these materials, either as distinct layers or as blends, alloys, copolymers, block copolymers or the like. The internal pressure barrier may also contain solid state additives. In one embodiment, the internal pressure barrier 12 includes a modulus of elasticity greater than about approximately 50,000 psi, and/or a strength greater than about approximately 1,000 psi. In some embodiments, the internal pressure barrier 12 can carry at least fifteen percent of the axial load along the longitudinal axis, at least twenty-five percent of the axial load along the longitudinal axis, or at least thirty percent of the axial load along the longitudinal axis at a termination, while in some embodiments, the internal pressure barrier 12 can carry at least fifty percent of the axial load along the longitudinal axis at a termination. Axial load may be determined at the ends of a tube. For example, at the ends, or a termination, of a tube, there may be a tensile (e.g. axial) load equal to the internal pressure multiplied by the cross-sectional area of the inner diameter of the pipe.

Referring back to FIG. 1, the spoolable tube 10 can also include one or more reinforcing layers 14. In one embodiment, the reinforcing layers can include fibers having at least a partially helical orientation relative to the longitudinal axis of the spoolable tube. The fibers may have a helical orientation between substantially about thirty degrees and substantially about seventy degrees relative to the longitudinal axis 17. For example, the fibers may be counterwound with a helical orientation of about ±40°, ±45°, ±50°, ±55°, and/or ±60°. The reinforcing layer may include fibers having multiple, different orientations about the longitudinal axis. Accordingly, the fibers may increase the load carrying strength of the reinforcing layer(s) 14 and thus the overall load carrying strength of the spoolable tube 10. In another embodiment, the reinforcing layer may carry substantially no axial load carrying strength along the longitudinal axis at a termination.

The reinforcing layer(s) 14 can be formed of a number of plies of fibers, each ply including fibers. In one embodiment, the reinforcing layer(s) 14 can include two plies, which can optionally be counterwound unidirectional plies. The reinforcing layer(s) can include two plies, which can optionally be wound in about equal but opposite helical directions. The reinforcing layer(s) 14 can include three, four, five, six, seven, eight, or more plies of fibers, each ply independently wound in a helical orientation relative to the longitudinal axis. Plies may have a different helical orientation with respect to another ply, or may have the same helical orientation. The reinforcing layer(s) 14 may include plies and/or fibers that have a partially and/or a substantially axial orientation. The reinforcing layer may include plies of fibers with a tape or coating, such as a tape or coating that includes a abrasion resistant material or polymer, disposed between each ply, underneath the plies, on the outside of the plies, or optionally disposed between only certain plies. In some embodiments, an abrasion resistant layer is disposed between plies that have a different helical orientation.

The fibers can include structural fibers and flexible yarn components. The structural fibers can be formed of graphite, glass, carbon, KEVLAR, aramid, fiberglass, boron, polyester fibers, polyamide, ceramic, inorganic or organic polymer fibers, mineral based fibers such as basalt fibers, metal fibers, and wire. The flexible yarn components, or braiding fibers, graphite, glass, carbon, KEVLAR, aramid, fiberglass, boron, polyester fibers, polyamide, ceramic, inorganic or organic polymer fibers, mineral based fibers such as basalt fibers, metal fibers, and wire. The fibers included in the reinforcing layer(s) 14 can be woven, braided, knitted, stitched, circumferentially wound, helically wound, axially oriented, and/or other textile form to provide an orientation as provided herein (e.g., in the exemplary embodiment, with an orientation between substantially about thirty degrees and substantially about seventy degrees relative to the longitudinal axis 17). The fibers can be biaxially or triaxially braided.

In one embodiment, the reinforcing layer(s) 14 includes fibers having a modulus of elasticity of greater than about 5,000,000 psi, and/or a strength greater than about 100,000 psi. In some embodiments, an adhesive can be used to bond the reinforcing layer(s) 14 to internal pressure barrier 12. In other embodiments, one or more reinforcing layers are substantially not bonded to one or more of other layers, such as the inner liner, internal pressure barriers, or external layer(s).

Figure 2:
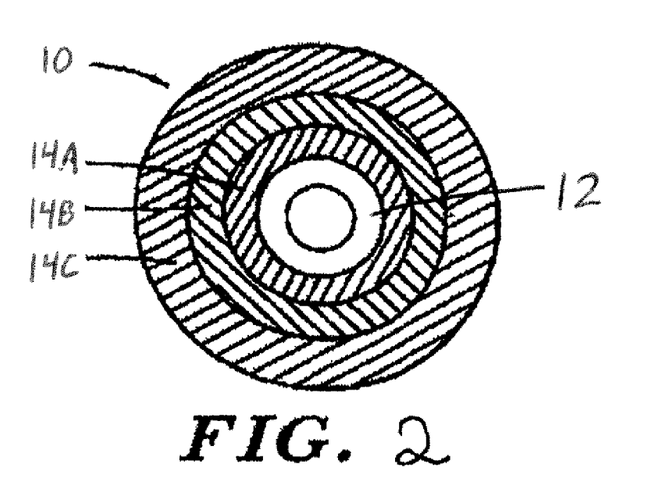
FIG. 2 is a cross-sectional view of a spoolable tube having an inner pressure barrier surrounded by multiple reinforcing layers.

FIG. 2 illustrates a cross-section of a circular spoolable tube 10 having an inner pressure barrier liner 12 and a first reinforcing layer 14A, a second reinforcing layer 14B, and a third reinforcing layer 14C. Each of the reinforcing layers 14A-C may be formed of fibers, and each of the reinforcing layers 14A-C successively encompasses and surrounds the underlying reinforcing layer and/or pressure barrier 12.

The fibers in each of the reinforcing layers 14A-C can be selected from the same or different material. For example, the first reinforcing layer 14A can comprise helically oriented glass fibers; second reinforcing layer 14B can comprise a ply having helically oriented glass fiber at the same angle, but at an opposite orientation of the first reinforcing layer 14A; and third reinforcing layer 14C can comprise plies of fibers having a clockwise and counter-clockwise helically oriented glass fibers. Further, the different reinforcing layers 14A-C can include different angles of helical orientation. For example, in one embodiment, the different layers can have angles of orientation between substantially about thirty degrees and substantially about seventy degrees, relative to the axis 17. Alternatively, the different layers can have angles of orientation between substantially about forty-six degrees and substantially about fifty-two degrees, relative to the axis 17. In some embodiments, the different layers 14A-C can have more than one fiber within a layer, such as carbon and glass, and/or carbon and aramid, and/or glass and aramid. Further, the different layers 14A-C may each comprise multiple plies, each independent ply having a different, or substantially the same, helical orientation with respect to other plies within a layer.

The reinforcing layer(s) 14 can include, in one or more embodiments of this disclosure, a hydrocarbon such as disclosed above. In some embodiments, the reinforcing layer(s) comprise a reinforcing material or hydrocarbon matrix as disclosed herein. For example, a spoolable tube, with for example, a diameter of about 1 inch to about 6 inches, is disclosed herein for use with pressurized or unpressurized fluids up to about 375 psi and/or fluids with a temperature up to about 180° F. In this and other embodiments, a matrix with a high modulus and a thin wall may be sensitive to impact damage and/or collapse or kinking during spooling, and therefore a hydrocarbon matrix may have a low modulus for use in such an embodiment. In this and other embodiments, a matrix with a high modulus and a thin wall may have low allowable spooling or bending strain, but a hydrocarbon matrix with a lower modulus may allow for higher spooling or bending strains.

In some embodiments, the permeability of a solid hydrocarbon matrix or the reinforcing layer 14 is higher than the permeability of the internal pressure barrier liner 12, for example the permeability of a solid hydrocarbon matrix may be at least twice, three times or even at least five times higher than that of the internal pressure barrier liner 12. As temperature increases above, for example, room temperature, the permeability of a hydrocarbon matrix may increases with temperature faster than the permeability of a pressure barrier increases with temperature.

Figure 3:
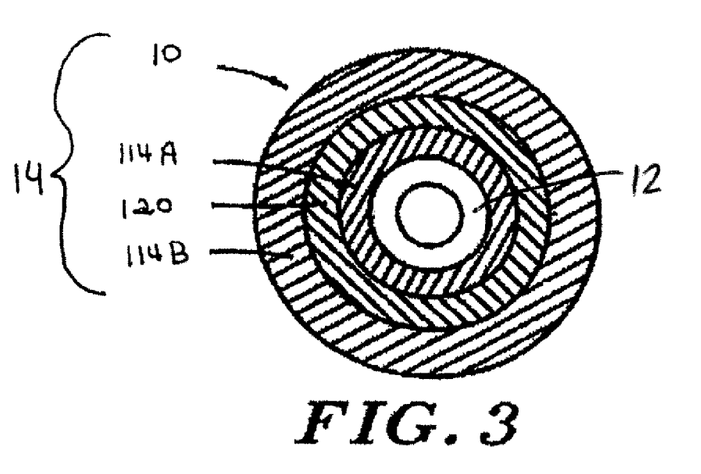
FIG. 3 is cross-sectional view of a spoolable tube having an inner pressure barrier surrounded by a reinforcing layer that includes two plies of fibers with an abrasion layer between the two plies.

FIG. 3 illustrates a cross-section of a circular spoolable tube 10 having an inner pressure barrier liner 12 and a first reinforcing layer 14. Reinforcing layer 14 comprises a first ply of fibers 114A, an abrasion resistant layer 120, and a second ply of fibers 114B. Each of the plies 114A, B may be formed of fibers, and each of ply 114A, abrasion resistant layer 120, and ply 114B successively encompasses and surrounds any other underlying reinforcing layer, abrasion resistant layer, ply(s) and/or pressure barrier 12.

The fibers in each of plies 114A, B can be selected from the same or different material. For example, the ply 114A can comprise at least partially helically oriented glass fibers; second ply 114B can comprise a ply having at least partially helically oriented glass fiber at the same angle, but at an opposite orientation of the first ply 114A. Further, the plies 114A, B can include different angles of helical orientation. For example, in one embodiment, the different plies can have angles of orientation between substantially about thirty degrees and substantially about seventy degrees, relative to the axis 17. Alternatively, the different plies can have angles of orientation between substantially about forty-six degrees and substantially about fifty-two degrees, relative to the axis 17. For example, one ply 114A may comprise fibers with helical orientation of about ±40°, ±45°, ±50°, ±55°, and/or ±60°, and a second ply 114B may comprise fibers with about an equal but opposite orientation. One or more plies, or one or more fibers within a ply may be substantially axially oriented. Further, the plies 114A, B can include about the same angle of helical orientation. In some embodiments, the different plies 114A, B can have more than one fiber within a ply, such as carbon and glass, and/or carbon and aramid, and/or glass and aramid.

Figure 4:
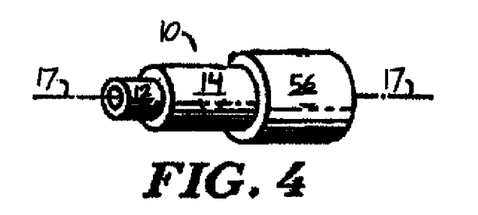
FIG. 4 is a side view, partially broken away, of a spoolable tube having an inner pressure barrier, a reinforcing layer, and an external layer.

FIG. 4 illustrates a spoolable tube 10 elongated along an axis 17 and having an internal pressure barrier 12, a reinforcing layer 14, and at least one external layer 56 enclosing the reinforcing layer(s) 14. The external layer(s) 56 may otherwise be understood to be an outer protective layer. The external layer 56 can bond to a reinforcing layer(s) 14, and in some embodiments, also bond to an internal pressure barrier 12. In other embodiments, the external layer 56 is substantially unbonded to one or more of the reinforcing layer(s) 14, or substantially unbonded to one or more plies of the reinforcing layer(s) 14. The external layer 56 may be partially bonded to one or more other layers of the tube.

The external layer(s) 56 can provide wear resistance, UV, and impact resistance or thermal insulation, or selectively increase or decrease the permeability. For example, the external layer 56 can provide abrasion resistance and wear resistance by forming an outer surface to the spoolable tube that has a low coefficient of friction thereby reducing the wear on the reinforcing layers from external abrasion. Further, the external layer 56 can provide a seamless layer, to, for example, hold the inner layers 12, 14 of the coiled spoolable tube 10 together. The external layer 56 can be formed of a filled or unfilled polymeric layer. Alternatively, the external layer 56 can be formed of a fiber, such as aramid or glass, with or without a matrix. Accordingly, the external layer 56 can be a polymer, thermoset, a thermoplastic, a thermoplastic elastomer, a thermoplastic foam, an elastomer, a rubber, a copolymer, and/or a composite, where the composite includes a filled polymer and a nano-composite, a polymer/metallic composite, and/or a metal. In some embodiments, the external layer(s) 56 can include one or more of polyethylene, a cross-linked polyethylene, a polybutylene, a polyvinylidene fluoride, a polyamide, polyethylene terphthalate, polyphenylene sulfide and/or a polypropylene. The external layer 56 can include a modulus of elasticity greater than about approximately 50,000 psi, and/or a strength greater than about approximately 1,000 psi. In an embodiment, the external layer 56 can carry at least ten percent, twenty percent, twenty-five percent, thirty percent or even at least fifty percent of an axial load in the longitudinal direction at a termination. A seamless external layer can comprise, for example, a perforated thermoplastic.

In some embodiments, the external layer 56 can be formed by extruding, while the layer 56 can be formed using one or more materials applied at least partially helically and/or at least partially axially along the longitudinal axis 17. The material can include, for example, one or more polymeric tapes. In an example embodiment, the external layer 56 can include and/or otherwise have a coefficient of friction less than a coefficient of friction of a reinforcing layer 14.

Particles can be added to the external layer 56 to increase the wear resistance of the external layer 56. The particles used can include one or more of ceramics, minerals, metallics, polymerics, silicas, or fluorinated polymers. For example, adding TEFLON (MP 1300) particles and an aramid powder (PD-T polymer) to the external layer 56 can reduce friction and enhance wear resistance. Particles, for example, $TiO_2$ or carbon black, may be added to increase UV resistance of the external layer.

It can be understood that pressure from fluids transported by the spoolable tubes 10 disclosed herein may not be properly released from the reinforcing layer(s) 14, and/or from the inner pressure barrier liner and/or from within the external layer, without, for example, an external layer having a sufficient permeability to provide such pressure release. Such accumulation of pressure can cause deterioration of the spoolable pipe 10, for example, external layer rupture or inner pressure barrier collapse when bore pressure is reduced. Accordingly, in some embodiments, to allow for pressure release along the length of the spoolable pipe 10, the external layer(s) 56 can include and/or have a permeability at least five, or at least ten times greater than the permeability of the internal pressure barrier 12, the reinforcing layer 14, or a solid hydrocarbon matrix as disclosed herein. In some embodiments, a solid hydrocarbon matrix is selected so that the permeability of the matrix is lower that the permeability of the external layer. For example, external layer(s) 56 include perforations or holes spaced along the length of tube. Such perforations can, for example, be spaced apart about every 10 ft, about every 20 ft, about every 30 ft, and even about or greater than about every 40 ft. In one embodiment, the external layer 56 can be perforated to achieve a desired permeability, while additionally and optionally, an external layer 56 can include one or more polymeric tapes, and/or may be discontinuous.

The disclosed spoolable tubes 10 can also include one or more couplings or fittings. For example, such couplings may engage with, be attached to, or in contact with one or more of the internal and external layers of a tube, and may act as a mechanical load transfer device. Couplings may engage one or both of the inner liner, the external wear layer or the reinforcing layer. Couplings or fittings may be comprised, for example, of metal or a polymer, or both with or without elastomeric seals such as O-rings. In some embodiments, such couplings may allow tubes to be coupled with other metal components. In addition, or alternatively, such couplings or fittings may provide a pressure seal or venting mechanism within or external to the tube. One or more couplings may each independently be in fluid communication with the inner layer and/or in fluid communication with one or more reinforcing layers and/or plies of fibers or abrasion resistant layers, and/or in fluid communication with an external layer. Such couplings may provide venting, to the atmosphere, of any gasses or fluids that may be present in any of the layers between the external layer and the inner layer, inclusive.

Figure 5:
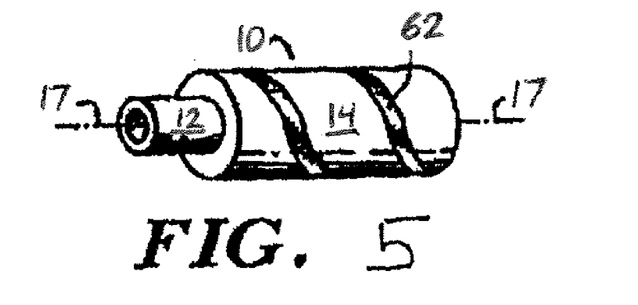
FIG. 5 is a side view, partially broken away, of a spoolable tube that includes an energy conductor.

With reference to FIG. 5, the disclosed spoolable tubes 10 can also include one or more energy conductors 62 that can be integral with the wall of the spoolable pipe. Accordingly, the energy conductors 62 can be integral with the internal pressure barrier, reinforcing layer(s), and/or exist between such internal pressure barrier 12 and reinforcing layer 14, and/or exist between the internal pressure barrier 12 and an external layer. In some embodiments, the energy conductor 62 can extend along the length of the spoolable tube 10. The energy conductors 62 can include an electrical guiding medium (e.g., electrical wiring), an optical and/or light guiding medium (e.g., fiber optic cable), a hydraulic power medium (e.g., a high pressure tube or a hydraulic hose), a data conductor, and/or a pneumatic medium (e.g., high pressure tubing or hose).

The disclosed energy conductors 62 can be oriented in at least a partially helical direction relative to a longitudinal 17 axis of the spoolable tube 10, and/or in an axial direction relative to the longitudinal axis 17 of the spoolable tube 10.

FIG. 5 illustrates a spoolable tube 10 elongated along an axis 17 wherein the spoolable tube includes an internal pressure barrier 12, a reinforcing layer 14, and an energy conductor 62. In the FIG. 5 embodiment, the energy conductor 62 forms part of the reinforcing layer 14; however, as provided previously herein, it can be understood that the energy conductor(s) 62 can be integrated with and/or located between internal pressure barrier 12 and the reinforcing layer 14.

A hydraulic control line embodiment of the energy conductor 62 can be either formed of a metal, composite, and/or a polymeric material.

In one embodiment, several energy conductors 62 can power a machine operably coupled to the coiled spoolable tube 10. For instance, a spoolable tube 10 can include three electrical energy conductors that provide a primary line 62, a secondary line 62, and a tertiary line 62 for electrically powering a machine using a three-phase power system. As provided previously herein, the spoolable tube 10 can also include internal pressure barriers 12 for transmitting fluids along the length of the tube 10.

A method is also provided for fabricating or making a spoolable pipe such as described above. Such a spoolable pipe may be fabricated, for example, by applying a matrix comprising hydrocarbon that is substantially in liquid form, for example, a disclosed hydrocarbon at a temperature greater than about 40° C., e.g. about 40° C. to about 80° C., to fibers, for example, to a bundle of fibers, to form a reinforcing layer, and cooling the reinforcing layer to room temperature.

In an alternate embodiment, a method for producing a spoolable tube is provided that includes providing an inner layer of said spoolable tube; applying a substantially liquid matrix composition comprising at least one of: polyethylene, polyethylene oligomers, polypropylene, polypropylene oligomers, polyolefins, polyolefin oligomers, a wax, and/or a grease to fibers at a temperature between about 20° C. and about 40° C., e.g at room temperature, drying said fibers so that a solid matrix composition between the fibers is formed; and winding the fibers around said inner layer. The liquid matrix composition may be dried at e.g. room temperature, or higher. In some embodiments, the substantially liquid matrix composition is an emulsion. In some embodiments, the method includes forming a tow comprising said fibers. The liquid matrix composition may be applied during, before, and/or after the fiber or tow winding.

The liquid matrix and/or the substantially liquid matrix composition may be applied during or after fiber manufacturing, for example, at the same time that a sizing may be applied to the fibers. The fiber-matrix tow or the coated fibers may then be applied or wound on an inner layer of a spoolable tube. A substantially liquid matrix composition or a liquid matrix may be applied to the fibers by for example dipping, brushing, soaking, or other applications as known to those skilled in the art.

For example, a method of producing a fiber tow is provided that includes forming fibers such as glass fibers; applying a liquid hydrocarbon to the fibers and/or dipping the fibers into a liquid hydrocarbon or a substantially liquid and drying and/or cooling the fibers. Such a method may include pulling fibers that have been, for example, dipped in or coated with a liquid hydrocarbon or disclosed liquid composition into a tow before cooling. Such a tow can be wound onto a tube before application to an inner layer of a spoolable tube, or can be applied or wound directly onto such a layer. Alternatively, the hydrocarbon and/or the substantially liquid matrix composition may be applied before, during or after the fibers are wound onto a pipe layer.

Applying a liquid hydrocarbon matrix at a temperature above room temperature, and cooling the matrix so that it solidifies at room temperature, or applying a liquid matrix composition at e.g. room temperature may also provide the advantage of at least partially eliminating the need to cure a matrix during pipe manufacture. Such curing step, usually at elevated temperature, often limits production speeds.

EXEMPLIFICATION

Example 1

Figure 6:
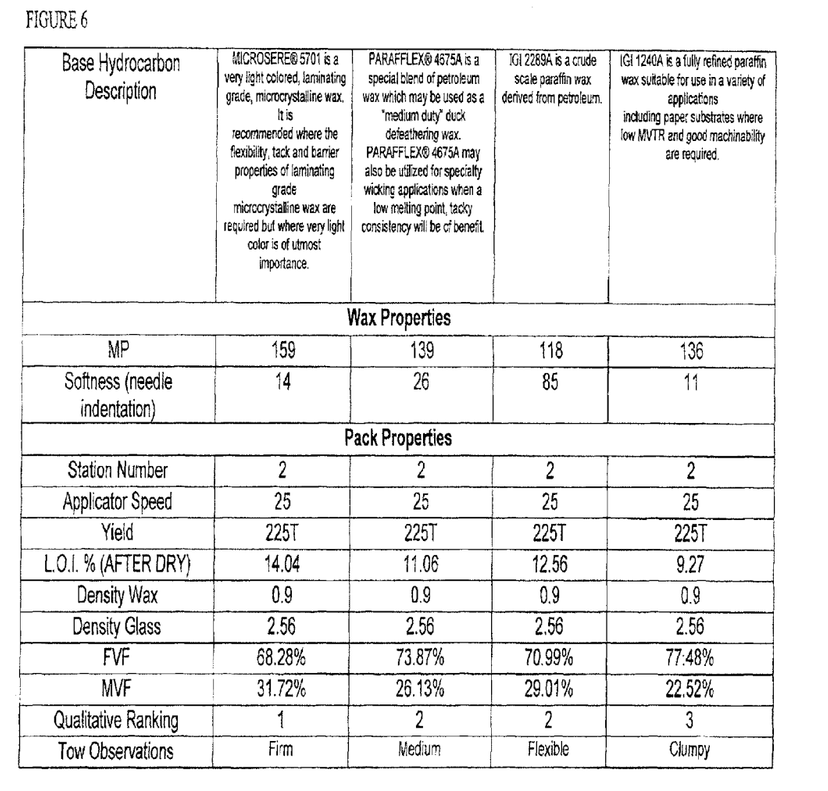
FIG. 6 indicates various properties of tows that include various low molecular weight hydrocarbons with glass fibers.
Figure 7:
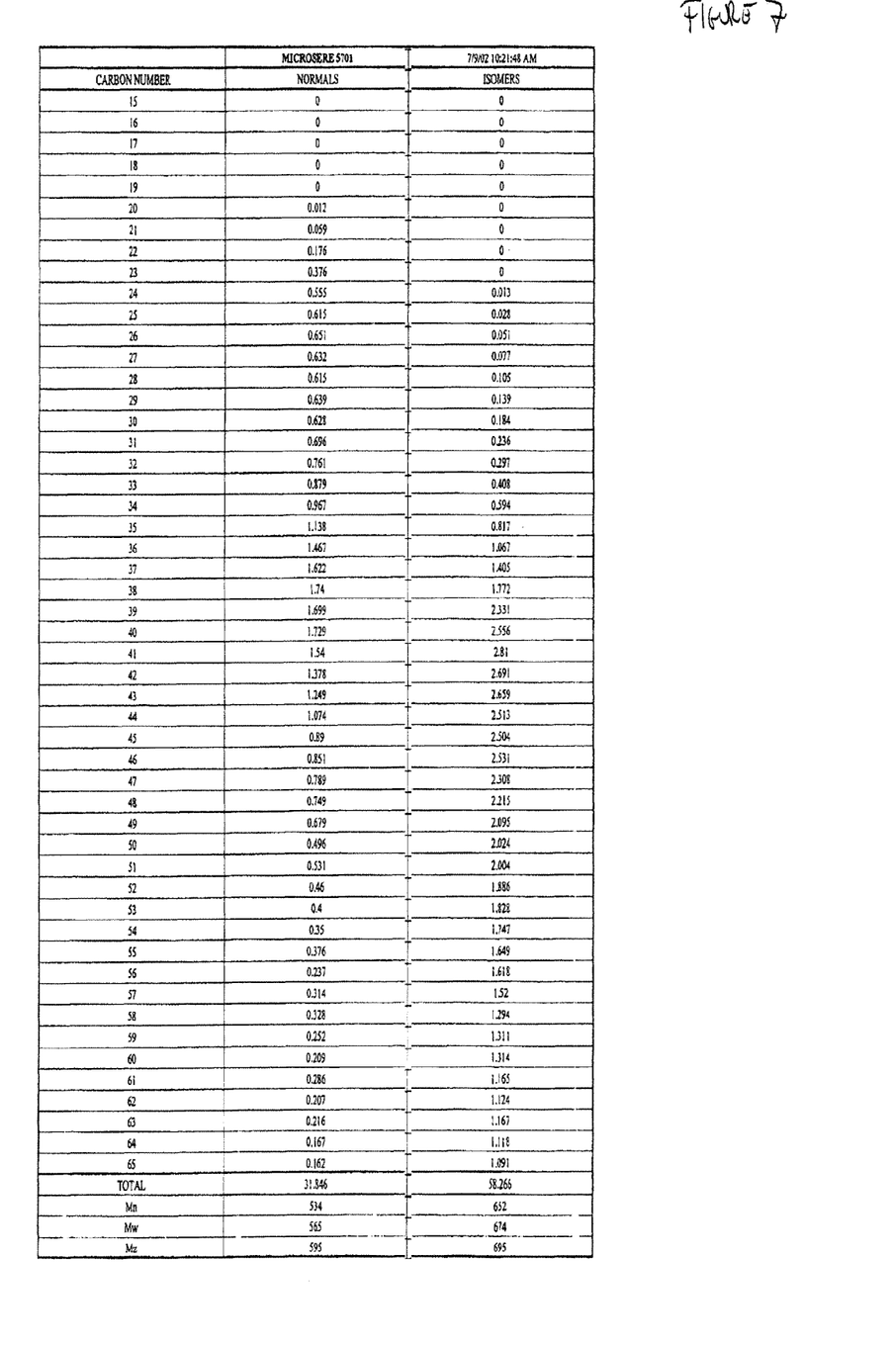
FIG. 7 shows the distribution of hydrocarbons in an exemplary solid hydrocarbon matrix.

Properties of various tows, or bundles of glass fibers embedded in various low molecular weight hydrocarbon matrices, are indicated in FIG. 6. LOI refers to loss on ignition, or the weight fraction of the low molecular weight hydrocarbon. FIVE refers to fiber volume fraction for each tow; MVF refers to the matrix volume fraction.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

All publications and patents mentioned herein, including those items listed below, are hereby incorporated by reference in their entirety as if each individual publication or patent was specifically and individually indicated to be incorporated by reference. In case of conflict, the present application, including any definitions herein, will control.

The composite tubes disclosed in U.S. Pat. Nos. 5,921,285; 6,016,845; 6,148,866; 6,286,558; 6,357,485; and 6,604,550.

What is claimed is:

1. A spoolable pipe for use with transported fluids pressurized between about 1 psi and about 1,000 psi, comprising:
    an internal pressure barrier formed about a longitudinal axis;
    at least one reinforcing layer enclosing the internal pressure barrier and comprising fibers and a solid hydrocarbon matrix, wherein said solid hydrocarbon matrix has a tensile modulus of about 100 to about 10,000 psi, wherein said solid hydrocarbon matrix is solid at about 25° C. and said matrix comprises hydrocarbons having an average molecular weight of less than about 20,000 grams/mole, wherein said hydrocarbons are selected from the group consisting of wax, grease, elastomers, tar and asphalt; and
    an external layer enclosing the at least one reinforcing layer.

2. The spoolable pipe of claim 1, wherein the at least one reinforcing layer comprises at least two plies of fibers.

3. The spoolable pipe of claim 2, wherein the two plies of fibers have at least a partial helical orientation relative to the longitudinal axis.

4. The spoolable pipe of claim 1, wherein said solid hydrocarbon matrix has a molecular weight of about 200 to about 8,000 grams/mole.

5. The spoolable pipe of claim 1, wherein said hydrocarbons comprise a polyolefin.

6. The spoolable pipe of claim 1, wherein said internal pressure barrier comprises at least one of: a metal, polyethylene, cross-linked polyethylene, polybutylene, ultra-high molecular weight polyethylene, polyvinylidene fluoride, polyamide, polypropylene, polyethylene terephthalate, or polyphenylene sulfide.

7. The spoolable pipe of claim 1, wherein said external layer comprises at least one of: polyethylene, cross-linked polyethylene, polybutylene, polyvinylidene fluoride, polyamide, polypropylene, polyethylene terephthalate, or polyphenylene sulfide.

8. The spoolable pipe of claim 1, wherein said fibers comprise a glass, an aramid, a carbon, a ceramic, a metal, a mineral, or a polymer, or combinations thereof.

9. The spoolable pipe of claim 1, further comprising an energy conductor.

10. The spoolable pipe of claim 1, wherein said solid hydrocarbon matrix comprises from about 10% to about 70% by volume of said reinforcing layer.

11. The spoolable pipe of claim 1, wherein said external layer is perforated.

12. The spoolable pipe of claim 1, wherein said spoolable pipe further comprises at least one of: a fire retardant, a UV stabilizer, an oxidative stabilizer, and a thermal stabilizer.

13. The spoolable pipe of claim 1, wherein said spoolable pipe further comprises a pigment.

14. The spoolable pipe of claim 1, wherein said external layer comprises a foam.

15. The spoolable pipe of claim 14, wherein said foam comprises at least one of: a thermoset polymer, a thermoplastic polymer, elastomer, rubber, a closed cell, and an open cell.

* * * * *